United States Patent [19]
Fiorentini

[11] Patent Number: 4,740,089
[45] Date of Patent: Apr. 26, 1988

[54] MOVABLE-CHAMBER MIXING HEAD

[75] Inventor: Carlo Fiorentini, Varese, Italy

[73] Assignee: Afros, S.p.A., Varese, Italy

[21] Appl. No.: 781,637

[22] Filed: Sep. 30, 1985

[30] Foreign Application Priority Data

Oct. 1, 1984 [IT] Italy .................. 22930 A/84

[51] Int. Cl.$^4$ .................. B01F 5/02
[52] U.S. Cl. .................. 366/150; 366/159; 422/133
[58] Field of Search .......... 366/150, 159, 173, 177, 366/136, 137; 422/133; 425/197, 205, 200

[56] References Cited

U.S. PATENT DOCUMENTS

| | | |
|---|---|---|
| 3,706,515 | 12/1972 | Keuerleber et al. |
| 3,905,582 | 9/1975 | Fiorentini |
| 3,960,506 | 6/1976 | Schmitzer |
| 4,073,408 | 2/1978 | Hartwig |
| 4,096,585 | 6/1978 | Fiorentini |
| 4,141,470 | 2/1979 | Schulte .................. 422/133 |
| 4,155,508 | 5/1979 | Fiorentini |
| 4,332,335 | 6/1982 | Fiorentini |
| 4,378,335 | 3/1983 | Boden .................. 422/133 |
| 4,418,041 | 11/1983 | Johnson .................. 366/159 |
| 4,473,531 | 9/1984 | Macosko .................. 366/159 |
| 4,477,191 | 10/1984 | Ersfeld et al. |

FOREIGN PATENT DOCUMENTS

| | | |
|---|---|---|
| 2007935 | 9/1971 | Fed. Rep. of Germany |
| 2515579 | 4/1975 | Fed. Rep. of Germany |
| 2612812 | 9/1977 | Fed. Rep. of Germany |
| 3144920 | 11/1981 | Fed. Rep. of Germany |
| 3340889 | 5/1985 | Fed. Rep. of Germany |
| 3323366 | 10/1985 | Fed. Rep. of Germany |

Primary Examiner—Robert W. Jenkins
Attorney, Agent, or Firm—Cushman, Darby & Cushman

[57] ABSTRACT

A high-pressure mixing head for at least two fluid components to be mixed together.

The mixing head comprises a movable mixing chamber, defined by a cylindrical hole whose longitudinal axis is parallel to the axis of an outlet duct; the mixing chamber is provided in a slider movable in a guide channel at right angles to and crossing the outlet duct for the mixture. The slider is movable from a first operative position in which the chamber is disposed on one side of the outlet duct, in correspondence with the nozzles for injecting the components to be mixed, and in which the outlet aperture of the mixing chamber communicates with the outlet duct, to a second position in which the injectors communicate with component recycling ducts, and in which the mixing chamber is axially aligned with the outlet duct and with a sliding cleaning member.

22 Claims, 6 Drawing Sheets

MOVABLE-CHAMBER MIXING HEAD

BACKGROUND OF THE INVENTION

This invention refers to a high-pressure mixing head for mixing fluid components, in particular for mixing chemical components suitable for forming polyurethane foams which are then fed into a mold.

The mixing head of the aforesaid kind, usually comprises a body having a mixing chamber into which open out the injectors for feeding the individual components, and an outlet duct axially aligned with the mixing chamber in which a control member in the form of a movable plunger slides from a retracted position in which it allows the components to be fed into the mixing chamber, to an advanced position in which it prevents the components from entering and at the same time expelling the residual mixture remaining in the mixing chamber and in the outlet duct; a mixing head of this type is known, for example, from DE PS 2007935.

At the end of each mixing cycle, the individual components can be made to recycle towards their respective tanks by means of per se known rotating recycling valves, or slide valves, or in any other way. From a previous patent IT 21022 A/78 of the same applicant, it is also known to provide a mixing chamber, small in volume and very limited in length, arranged at right angles and in direct communication with the outlet duct in order to improve the mixing degree.

In all the known mixing heads, the disposition of the mixing chamber is fixed with respect to the outlet duct, since both are made in the body of the head or in parts connected thereto.

In such heads the mixing is achieved by means of the collision of the jets of components, in correspondence with the feed injectors, after which the flow of mixture remains substantially unchanged; in order to improve the mixing degree, it has also been suggested to use restrictors in the outlet duct, DE A-2.007934 and DE A-2.612.812, thereby involving a complex structure and complicating the functioning of the head. Moreover, on the known mixing heads, the distance between the injection nozzles depends upon the crosswise dimensions of the mixing chamber, whereas it would be desirable to keep the nozzles as close as possible for satisfactory mixing. A reduction in the crosswise dimensions of the mixing chamber however cannot be carried beyond certain limits due to the fact that it would excessively reduce the strength of the cleaning member in the chamber itself; furthermore, it would make it difficult to make component recycling channels in the cleaning member with a sufficient cross-sectional area of flow, and would introduce excessive additional pressure losses, during the recycling phases of the components which would have a negative effect during the mixing phases.

A scope of this invention is to provide a high-pressure mixing head for at least two components, of completely new design, capable of providing a high degree of mixing by simple means, which make it possible to render the disposition and the distance between the injectors independent, with respect to the mixing chamber, the dimensions and volume of which can be suitably calculated in accordance with the desired rates of flow. A further scope of the invention is to provide a mixing head, as defined, in which the recycling channels for the components are provided outside the chamber itself, and can consequently be made with suitably-sized cross sectional areas for recycling the individual components, whilst keeping pressure losses to a minimum.

A still further scope of this invention is to provide a high-pressure mixing head capable of greatly improving the degree of mixing of the components, by providing subsequent mixing areas, whilst keeping the structure and the functioning of the head extremely simple. A still further scope of this invention is to provide a mixing head, of the aforementioned type, in which it is possible to avoid any contamination whatsoever of the chemical components and/or the mixture, by the fluids actuating the hydraulic control members.

SUMMARY OF THE INVENTION

According to this invention, a high-pressure mixing head is provided, comprising a mixing chamber into which the injectors for feeding the components to be mixed may open out, and in which the chamber presents a longitudinal axis parallel to the axis of an outlet duct for the mixture, through which a cleaning member slides, the improvement consisting in the fact that the mixing chamber is formed in a slider movable in a guide channel which crosses and lies at right angles to the outlet duct, said slider being movable from a first operative position in which the chamber is disposed on one side of the outlet duct and in correspondence with the injectors of the components, and in which the outlet aperture of the chamber communicates with the outlet duct, to a second position in which the mixing chamber is axially aligned with the outlet duct and with the aforesaid cleaning member.

According to a further feature of the invention, one or more intermediate ducts may be provided in parallel, between the outlet aperture of the mixing chamber, in the first position of the slider, and the entrance of the outlet duct, which ducts are defined by peripheral walls of the slider itself and of its guide channel, thereby exploiting the high kinetic energy and speed of the flow leaving the mixing chamber in order to further improve the degree of mixing. In this connection, it is advisable to keep the length of the branched-off paths or ducts, that is to say, the stroke of the slider in the mixing chamber, very short, for example just slightly longer than the overall width of the mixing chamber, corresponding to that of the outlet duct, measured in the moving direction of the slider.

BRIEF DESCRIPTION OF THE DRAWINGS

These and further features of the mixing head according to this invention will be more clearly apparent from the following description of an embodiment illustrated in the example shown in the accompanying drawings, in which.

DESCRIPTION OF THE INVENTION

Figure 1:
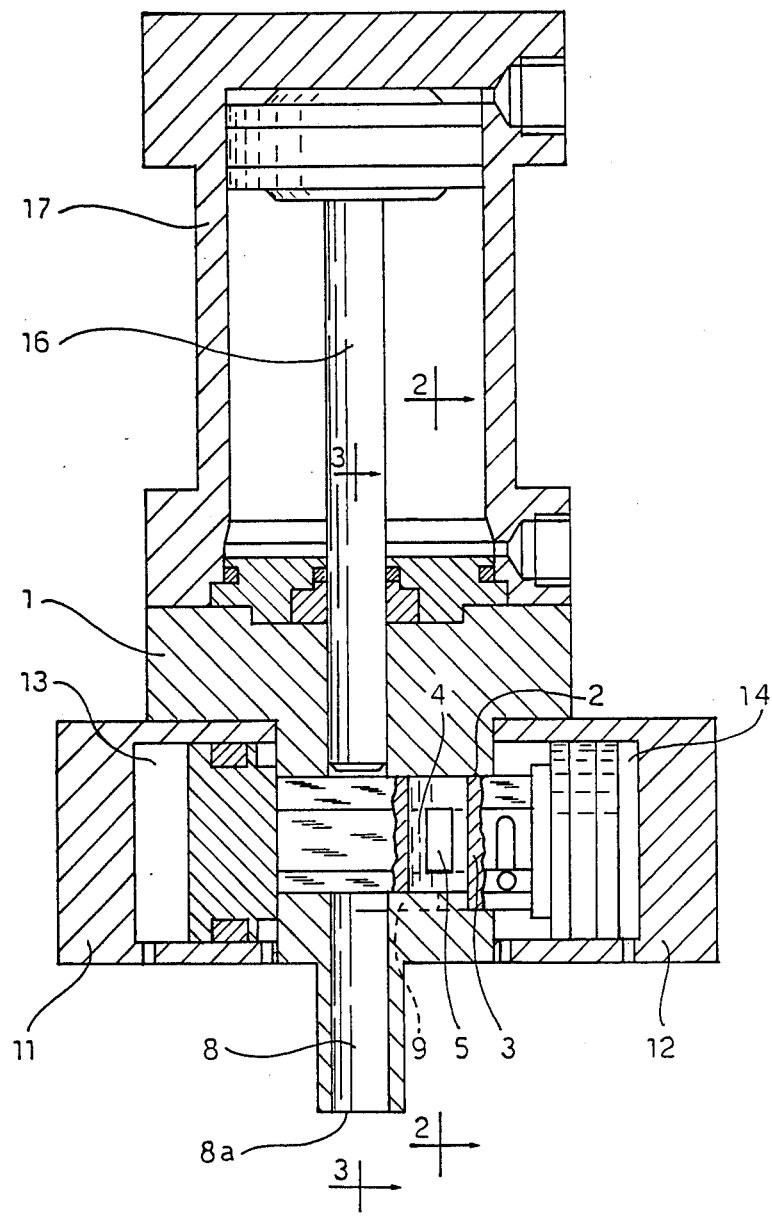
FIG. 1 shows a longitudinal cross-sectional view, in the mixing condition.

The mixing head comprises a casing or body portion 1 provided internally with a channel 2 along which a slider 3 for the mixing chamber slides and is guided; as shown, the mixing chamber 4 consists of a cylindrical hole made crosswise to the slider 3, that is to say, having its longitudinal axis at right angles to the longitudinal sliding axis of the slider; the hole 4 opens at both ends and on both sides, through the walls of the slider; the side apertures 5 in the mixing chamber fit tightly to longitudinal ribs 1a of the guide channel 2, which ribs penetrate into the mixing chamber 4 and sustain the injectors 6 and 7 for the components (FIG. 2), as explained further on. Reference 8 indicates an outlet duct for the mixture which crosses the channel 2 and has the same cross-section as the chamber 3 with which it may communicate, in the condition shown in FIG. 1, through separate branched-off paths or conduits 9 and 10 defined by side walls of the slider 3 and its guide channel 2, as explained further on. Therefore, in the embodiment shown, the mixing chamber 4 presents a longitudinal axis parallel to the axis of the outlet duct 8, with which it communicates by means of branched-off ducts 9 and 10, said chamber being movable, with the slider 3, in the direction of the sliding axis of the slider itself.

Figure 7:
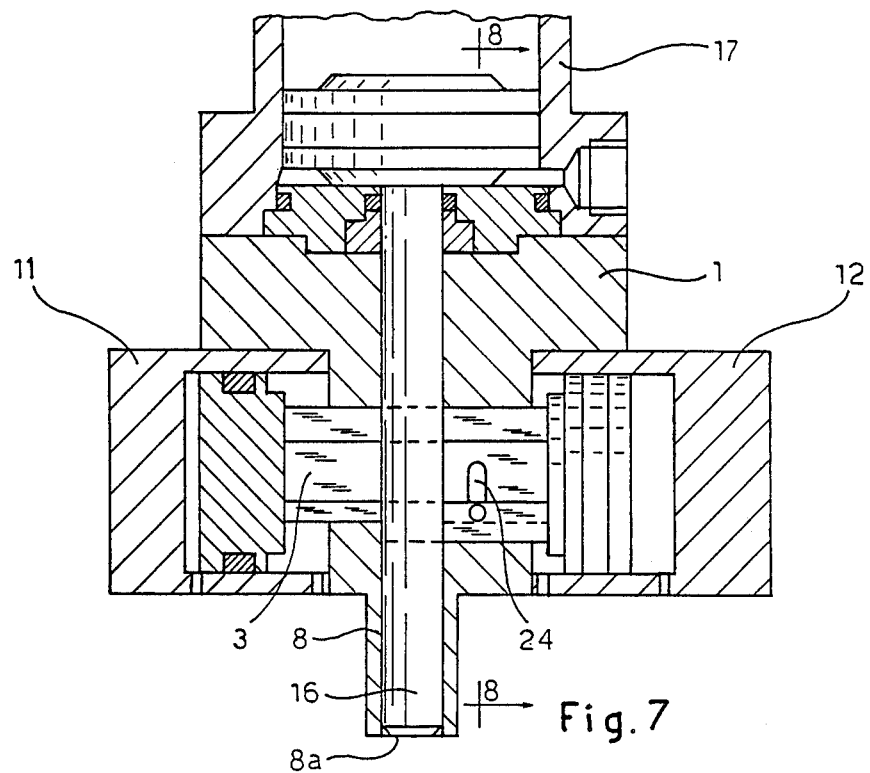
FIG. 7 shows a longitudinal cross-sectional view similar to that of FIG. 1, with the mixing head in the component recycling condition.

The slider 3 of the mixing chamber is made to move between two operative positions, shown in FIGS. 1 and 7, by any suitable control means, for example by means of a double-acting hydraulic cylinder, or as shown, by means of two opposing single-acting hydraulic cylinders 11 and 12, in which the hydraulic control fluid is simply fed into the chamber 13, and respectively 14 of each cylinder, which is situated on the side of the piston opposite the slider 3; thus, the chamber of each cylinder 11 and 12 which is opposite the first one, is simply open to the air, thereby eliminating specific hydraulic fluid seal problems in the direction of the mixing chamber 4 and, therefore, the causes of possible contamination of the chemical components and/or of the mixture itself.

The stroke of the slider 3 may be of any length, however it is preferable to keep it as short as possible, in order to switch over extremely rapidly from one operative condition to the other; the stroke of the slider, however, in this case, must be at least slightly longer than the overall width of the outlet duct 8, and of the chamber 4, measured in the sliding direction of the slider 3.

The mixing head 1 is completed by a cleaning member, both for the mixing chamber 4 and for the outlet duct 8, in the form of a plunger 16 having the same internal diameter or the same cross-section as the chamber 4 and duct 8; the cleaning member 16 is in turn connected to the piston of a control cylinder 17 to move from a retracted position with respect to the slider 3, shown in FIG. 1, in which it allows the slider to move, to an advanced position, through the chamber 4 and the duct 8 as far as the aperture 8a of the aforesaid duct (FIG. 7). As mentioned previously, an innovatory feature of the mixing head according to this invention lies mainly in the movable disposition of the mixing chamber 4, in the slider 3, as well as in the particular conformation of the slider itself which, together with its guide channel and by means of one or more longitudinal ribs, defines one or more ducts connecting the mixing chamber 4 to the outlet duct 8.

Figure 2:
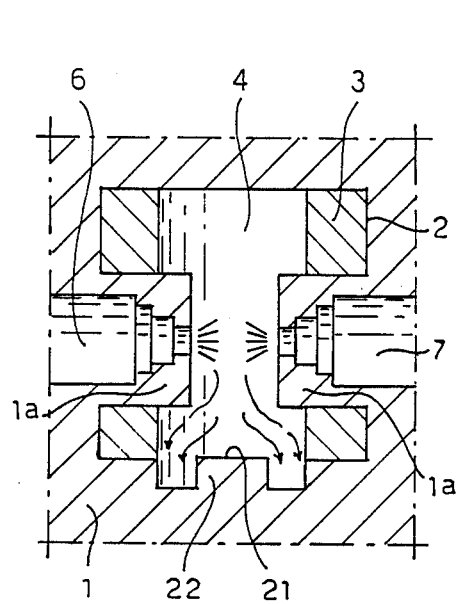
FIG. 2 shows an enlarged cross-sectional view along the line 2—2 of FIG. 1.
Figure 3:
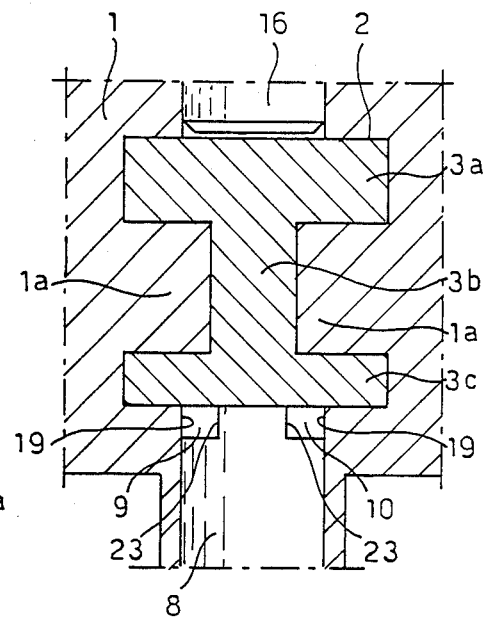
FIG. 3 shows an enlarged cross-sectional view along the line 3—3 of FIG. 1.

As can be seen from the figures, the slider 3 of the mixing chamber presents a double T-shaped cross-section, the upper wings 3a and lower wings 3c of which are larger than the diameter or maximum width of the mixing chamber 4, and in which the central web 3b of the slider is smaller in transveral width, for example, equal to two thirds or half the diameter of the chamber 4, so as to define two lateral apertures 5 in the chamber 4 through which the chemical components to be mixed can be injected by means of the injectors 6 and 7 (FIG. 2). Hence, the nozzles of the injectors 6 and 7 can be arranged very closely together, at a lesser distance than the diameter of the hole 4 constituting the mixing chamber, thereby exploiting to a greater extent the high kinetic energy generated by the impact forces between the jets in order to enable them to mix together to a high degree.

Figure 4:
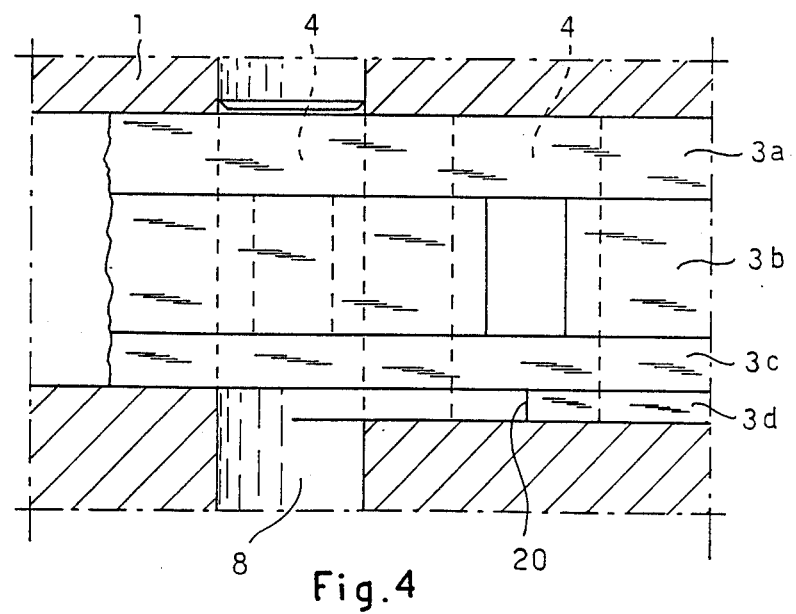
FIG. 4 shows a side view revealing the particular shape of the slider and the two operative positions of the mixing chamber.
Figure 5:
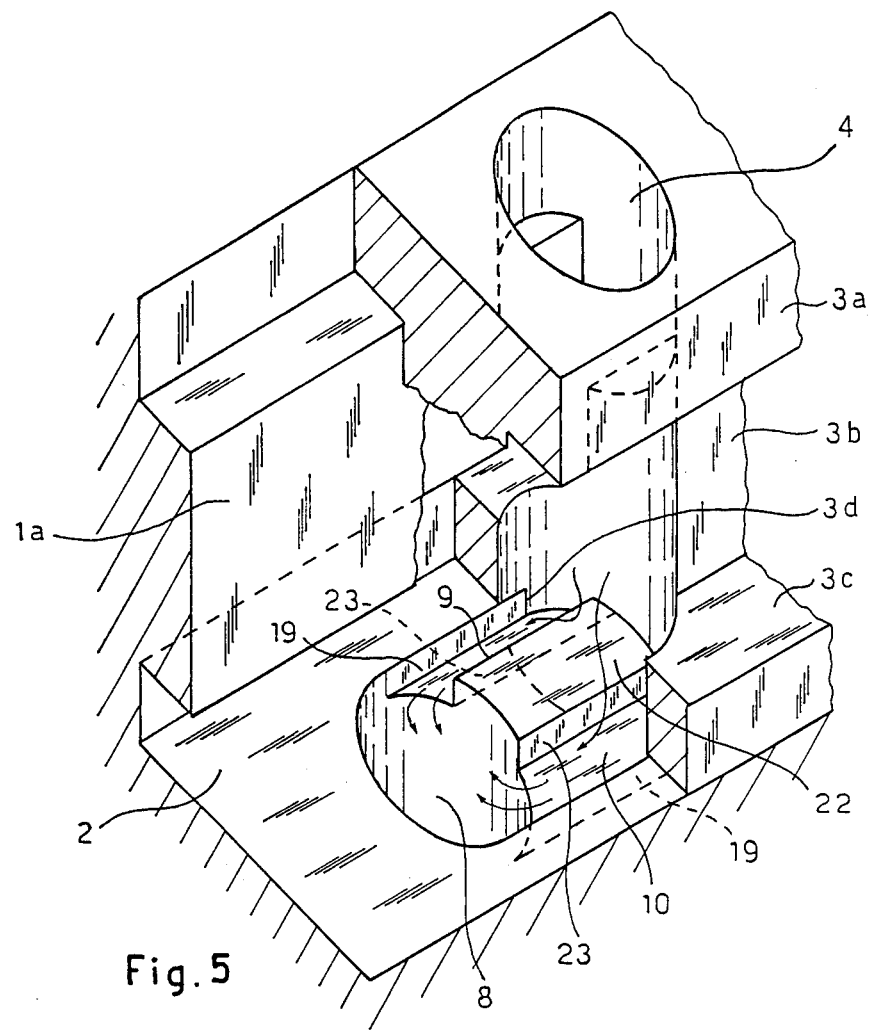
FIG. 5 shows a partially cutaway perspective view of the slider and of its guide channel, showing the branched-off paths of the flows which connect the movable mixing chamber to the outlet duct.
Figure 6:
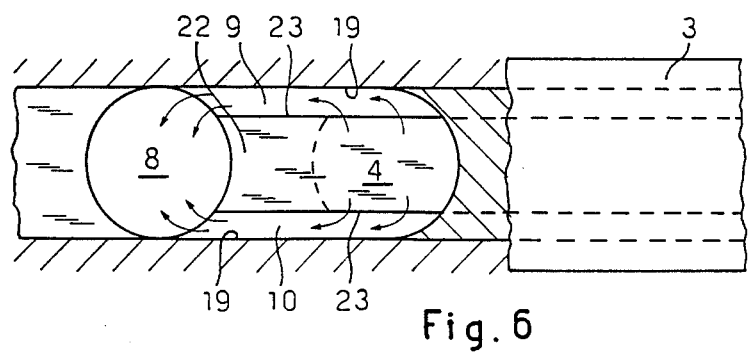
FIG. 6 shows a simplified plan view illustrating the disposition of FIG. 4.

The slider 3, in a position beneath the lower wing 3c, is provided with two laterally spaced longitudinal ribs 3d delimited by flat sides and bottom surfaces, in which the distance between the lateral surfaces 18 (FIG. 8) of the two ribs is equal or less than the diameter or the maximum crosswise width of the mixing chamber 4; consequently, the slider guide channel 2, in correspondence with the lower part 3d of the slider, is provided with lateral guide surfaces 19 arranged tangentially to or crossing the mixing chamber 4 and the outlet duct 8. The lower ribs 3d leading off from one end of the slider, the right one in the figures, continue half way along the mixing chamber where they form a step (FIG. 4), the concave front surface of such step defining part of the lower surface of the mixing chamber 4, which aligns with the upper surface of the outlet duct 8 when the slider is in the condition shown in FIG. 7. The longitudinal ribs 3d of the slider 3 define, moreover, a longitudinal intermediate groove 21 corresponding to a longitudinal guiding rib 22.

Separate channels 9 and 10, defined by the bottom surface and the lateral surfaces 19 and 23 of the slider guiding channel and by the lower surface of the wings 3c, are thus formed on either side of the rib 22. In this way, in the retracted condition of the mixing chamber 4, shown in FIGS. 1, 4, 5 and 6, the two parallel ducts 9, 10 are formed which define separate paths for the flow of mixture from the outlet aperture of the mixing chamber 4, which then open out on opposite sides at the entrance to the outlet duct 8.

The movable disposition of the mixing chamber 4, in the slider 3, makes it possible moreover to use separate recycling ducts 24, on the sides of the slider in order to recycle the individual components towards their respective tanks, not shown, when the mixing chamber is axially aligned with the outlet duct 8. The disposition of the recycling ducts on the sides of the slider 3, separate from the mixing chamber 4 and its cleaning member 16, and their disposition in a transversal plane, offers considerable advantages in that it is possible to dimension the recycling ducts independent of the dimensions of the mixing chamber, and to make the channels 24 of the desired width in order to reduce to a minimum any additional pressure losses; in this way, it is possible to ensure that the recycling pressure of each individual component is practically the same as the pressure required for feeding the individual components during the mixing phase.

This fact, together with the others, helps to further improve the mixing degree, especially during the initial mixing phases which are the most critical with regard to maintaining the correct stoichiometric ratios in mixing the components. Although the recycling ducts may also be orientated differently, their disposition in a plane transversal to the axis of the slider is advantageous, in that it makes it possible to reduce to a minimum the displacement of the slider necessary for switching from a component mixing phase to a recycling phase.

The mixing head according to this invention operates in the following way: assuming that the slider is in the operative position shown in FIG. 7, in which the individual components are made to recycle, and is then moved to the operative position shown in FIGS. 1, 2, 3, 4, 5 and 6, in which the mixing chamber 4 is completely retracted with respect to the duct 8, and in which the chamber 4 is in communication with the duct 8 by means of the branched-off ducts 9 and 10 defined by the walls of the slider 3 and of its guide channel. In this condition, the injectors 6 and 7 open out into the mixing chamber (FIG. 2), as their nozzles are situated at a smaller minimum distance than the width of the chamber 4 itself.

The two jets, colliding with each other at high speed, mix together thoroughly and the resulting mixture, in flowing down to the lower part of the chamber 4, separates into two different flows which are conveyed, through the branched ducts 9 and 10, on two opposing sides, tangentially to the upper end of the outlet duct 8. On arriving at this point the two flows, which still maintain high kinetic energy due to the shortness of the path, collide with each other again and, thanks also to the tangential disposition of the side walls 19, with respect to the duct 8, a swirl is generated, which gradually quietens down due to the larger cross-section of the duct 8, which creates an additional mixing effect.

In other words, the separation of the two flows and their subsequent re-mixing in the channel 8, causes all the particles of the components to mix evenly together and to combine chemically, thereby obtaining a homogenous mixture which leaves the outlet of the duct 8 in a smooth steady or laminar flow.

Figure 8:
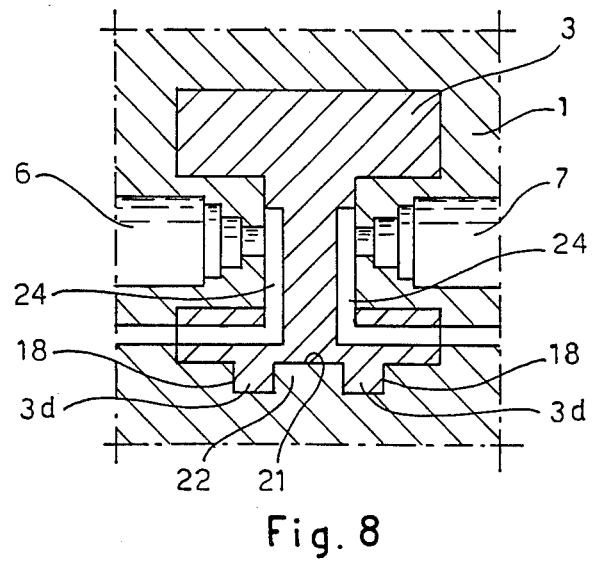
FIG. 8 shows a cross-sectional view along the line 8—8 of FIG. 7.

Upon completion of the mixing phase, the slider 3 is made to advance to the position shown in FIG. 7, in which the mixing chamber is axially aligned with the outlet duct 8 and in which the nozzles of the injectors 6 and 7 now open out into the recycling ducts 24, as shown in the cross-sectional view in FIG. 8. As the mixing chamber 4 is axially aligned with the outlet duct 8, and as the areas of their cross-sections are identical, it is possible to move forward the cleaning member plunger 16 which cleans the walls of the chamber 4 and of the duct 8, expelling all the residual mixture; this condition is shown in the cross-sectional view in FIG. 7.

Figure 9:
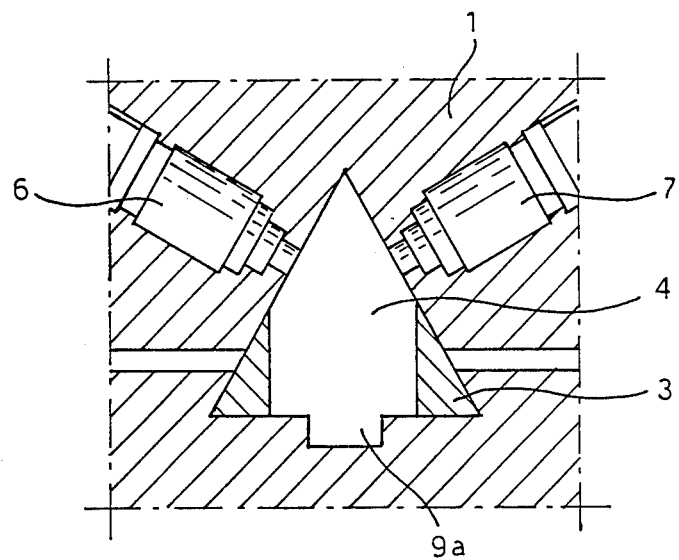
FIGS. 9 and 10 show two cross-sectional views similar to those of FIGS. 2 and 8, for a triangular slider.
Figure 10:
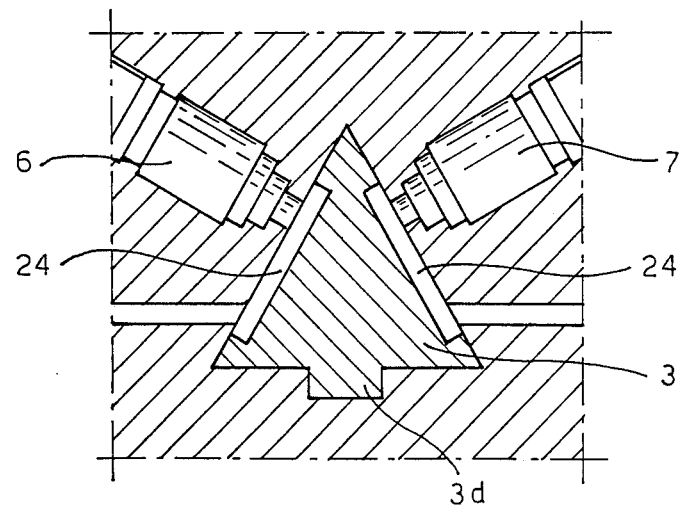

The head can now be re-used for a further mixing cycle, in a way wholly identical to that previously described. In the case illustrated, the slider 3 presents a double T-shaped cross-section and two longitudinal ribs under the lower wings; the intermediate ducts connecting the chamber 4 to the outlet duct 8 are situated on the bottom of the slide guide channel 2, in correspondence with said ribs; the cross-section of the slider 3 could however be of any shape whatsoever, for example T-shaped, rectangular or triangular, with one or more longitudinal ribs, each of which defining a corresponding intermediate duct connecting the chamber 4 to the outlet duct 8, on the bottom of the slider guide channel and ending in correspondence with the mixing chamber; a differently shaped slider 3 is shown, for example, in the cross-sectional views of FIGS. 9 and 10, where the same numerical references of the previous figures refer to similar or corresponding parts. In this case, the slider 3 presents a triangular cross-section, with a single rib $3d$ on the lower wall, defining a single central duct $9a$, as shown, for connecting the chamber 4 to the outlet duct 8, in the retracted condition of the chamber, with respect to the outlet duct itself. Although the overall cross-sectional area of the intermediate connecting duct or ducts may be of any value, such area is preferably chosen equal to or smaller than the cross sectional area of the mixing chamber 4 so that the flow of mixture maintains substantially the same speed on leaving the chamber, or is accelerated so as to create a further mixing effect along each individual intermediate duct and at the entrance of the outlet duct itself.

Figure 11:
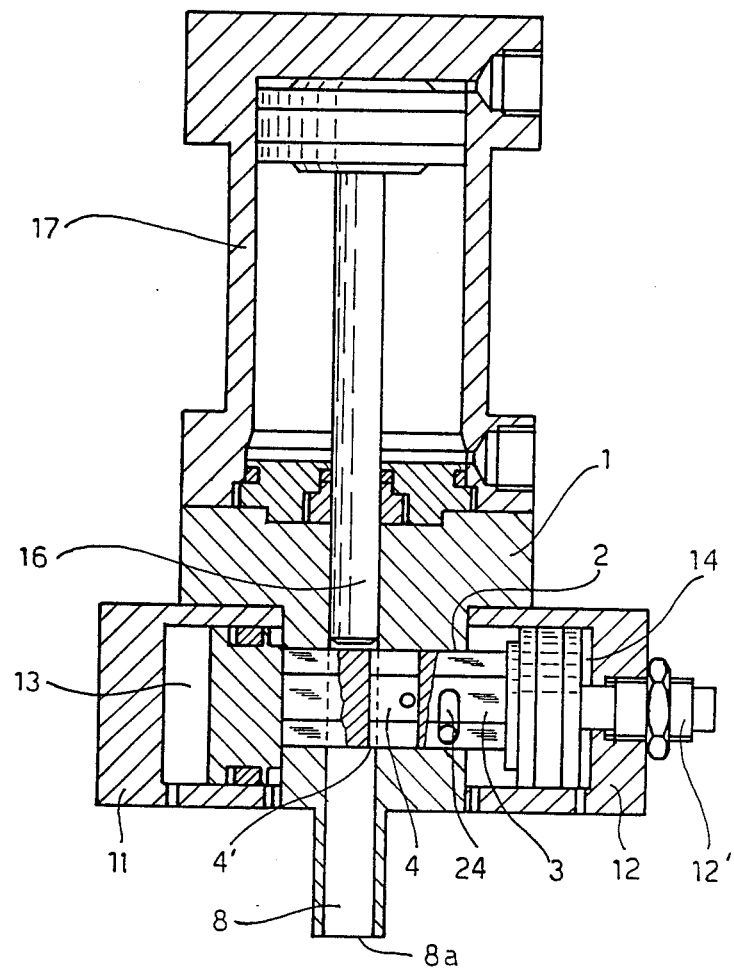
FIG. 11 shows a longitudinal cross-sectional view of a further embodiment.

FIG. 11 shows a second embodiment of the movable chamber mixing head, according to this invention, in which the same numerical references indicate parts corresponding to those of FIG. 1.

In the case shown, the stroke of the slider 3 is shorter than the diameter of the mixing chamber 4, that is to say, of the outlet duct 8; consequently, the mixing chamber 4 communicates directly with the outlet duct 8 through a narrow hole 4' which can be suitably regulated by means of an adjustable stop device for interrupting the stroke of the slider 3, defined for example by a set screw 12' and relative lock nut, said screw being screwed into the rear wall of the control cylinder 12 which is situated on the same side as the injectors 6, 7 for the components to be mixed together.

What is claimed is:

1. A high-pressure mixing head comprising injectors for feeding the components to be mixed, a mixing chamber into which the injectors open out, and an outlet duct terminating at an outlet aperture, said mixing chamber having a longitudinal axis which extends parallel to the axis of the outlet duct a reciprocating cleaning member mounted so as to be slidable within said outlet duct and said mixing chamber when the latter is axially aligned with the former, said head further including a slider including means defining said mixing chamber and being movable along a guide channel provided in said head at right angles to and crossing the outlet duct, said slider being movable between a first position in which the mixing chamber is disposed to one side of the outlet duct, in correspondence with the injectors for feeding the components, and in which the outlet aperture for the mixture in the chamber communicates with the outlet duct, and a second position in which the mixing chamber is axially aligned with the outlet duct and with the aforesaid cleaning member.

2. A mixing head as claimed in claim 1, in which the injectors for feeding the components are provided in longitudinal ribs extending along the guide channel for the slider, said ribs partially penetrating through lateral apertures into the mixing chamber.

3. A mixing head as claimed in claim 1, in which the stroke of the mixing chamber slider is longer than the diameter of the outlet duct, and in which, in the first operative position of the slider, the mixing chamber communicates with the outlet duct through at least one intermediate duct defined by peripheral walls of the slider and of its guide channel.

4. A mixing head as claimed in claim 3, in which, in correspondence with each intermediate duct connecting the mixing chamber to the outlet duct, the wall of the slider presents a corresponding longitudinal rib ending in correspondence with the mixing chamber.

5. A mixing head as claimed in claim 4, in which the distance between the outer lateral surfaces of the rib or of the longitudinal ribs on the bottom wall of the slider is equal to or less than the overall transversal width of the mixing chamber, measured in a direction at right angles to the axis of the slider.

6. A mixing head as claimed in claim 1, in which the slider of the mixing chamber is provided with separate recycling channels for each individual component, situated outside the mixing chamber and extending along on the sides of the slider.

7. A mixing head as claimed in claim 6, in which said recycling channels are disposed in a transversal direction to the axis of the slider.

8. A mixing head as claimed in claim 1, in which the slider presents a double T-shaped cross-section, provided with a central web and upper and lower lateral wings, in which the mixing chamber is defined by a cylindrical hole at right angles to the axis of the slider, and in which the web of the slider presents a smaller thickness than the diameter of the mixing chamber.

9. A mixing head as claimed in claim 8, in which, beneath the lower wings, the slider is provided with one or more longitudinal ribs, laterally spaced apart, which extend from one end of the slider to the outlet aperture of the mixing chamber.

10. A mixing head as claimed in claim 9, in which said longitudinal ribs comprise outer lateral walls situated tangentially to the opposing sides of the outlet aperture of the mixing chamber.

11. A mixing head as claimed in claim 10, in which, in correspondence with the outer lateral surfaces of the ribs on the slider, the guide channel is provided with lateral surfaces which merge tangentially to the wall of the outlet duct.

12. A mixing head as claimed in claim 9, in which the distance between the outer lateral surfaces of the rib or of the longitudinal ribs on the bottom wall of the slider is equal to or less than the overall transversal width of the mixing chamber, measured in a direction at right angles to the axis of the slider.

13. A mixing head as claimed in claim 1, in which the slider presents a triangular cross-section and in which the mixing chamber widens out, starting from the point in which the injectors penetrate into the chamber, towards the outlet aperture for the mixture.

14. A mixing head as claimed in claim 1, in which the mixing chamber slider is connected to a hydraulic control device.

15. A mixing head as claimed in claim 14, in which the hydraulic control device comprises two opposing single-acting control cylinders, each of which is connected to a respective end of the slider.

16. A mixing head as claimed in claim 15, in which the hydraulic cylinder control fluid is fed into the chamber of each cylinder which is situated on the side opposite to the slider.

17. A mixing head as claimed in claim 1, in which the stroke of the slider is equal to or longer than the overall transversal width of the mixing chamber, measured in the direction of the longitudinal axis of the slider.

18. A mixing head as claimed in claim 1, in which the stroke of the slider is shorter than the diameter of the outlet duct and in which the latter communicates with the mixing chamber through an orifice defined therebetween.

19. A mixing head as claimed in claim 18, in which adjusting means are provided for the orifice.

20. A mixing head as claimed in claim 18, in which the adjusting means comprise a set screw for adjusting the stroke of the slider.

21. A mixing head for mixing polyurethane constituents comprised of an outer housing, means defining a bore within said housing, a slide member slidably associated within said bore means, first means defining a mixing chamber within said slide member, second means defining recirculation passages relatively positioned between said slide member and said outer housing, third means defining at least one intermediate duct relatively positioned between said slide member and said bore, inlet orifice means for feeding the polyurethane constituents into said mixing head, outlet orifice means for receiving recirculated polyurethane constituents means in said outer housing defining a discharge duct and an axially aligned cleaning means, and drive means for moving said slide member between a first position where said mixing chamber means is offset with respect to said discharge duct but lies in communication with both said outlet orifice means and said discharge duct means through said intermediate duct means and a second position where said mixing chamber means is axially aligned with said discharge duct means and said cleaning member and where said slide member opens communication between said inlet and outlet orifice means, respectively, so that the polyurethane constituents will recirculate.

22. A high-pressure mixing head for mixing polyurethane constituents comprised of an outer housing, means defining a bore within said housing, a slide member slidably associated within said bore means, first means defining a mixing chamber within said slide member, second means defining recirculation passages relatively positioned between said slide member and said outer housing, inlet orifice means for feeding the polyurethane components into said mixing head, outlet orifice means for receiving recirculated polyurethane components, means in said outer housing defining a discharge duct axially aligned with a cleaning plug member, and drive means for moving said slide member between a first position where said mixing chamber means is axially aligned with said discharge duct and said cleaning member, and in which said inlet orifice means communicate with said recirculation passages so that the polyurethane components will recirculate, and a second position where said mixing chamber means are disposed laterally with respect to said discharge duct and communicates with said discharge duct through means defining at least one intermediate duct defined by peripheral walls of said slide member and of said bore, and in which said inlet orifice means for feeding the polyurethane components open into said mixing chamber means.

* * * * *